United States Patent
van de Weijer et al.

(10) Patent No.: US 8,696,854 B2
(45) Date of Patent: Apr. 15, 2014

(54) METHOD FOR PRODUCING CONTAINER PARTS, CONTAINER PARTS, METHOD FOR PRODUCING A MULTILAYER FOIL, MULTILAYER FOIL

(75) Inventors: Franciscus Johannes Maria van de Weijer, Oeffelt (NL); Maurits Simon Johannes Maria Driessen, Venray (NL)

(73) Assignee: Winstore Europe B.V., Hoogeloon (NL)

( * ) Notice: Subject to any disclaimer, the term of this patent is extended or adjusted under 35 U.S.C. 154(b) by 1012 days.

(21) Appl. No.: 10/585,484
(22) PCT Filed: Jan. 18, 2005
(86) PCT No.: PCT/NL2005/000033
§ 371 (c)(1),
(2), (4) Date: May 14, 2008
(87) PCT Pub. No.: WO2005/068321
PCT Pub. Date: Jul. 28, 2005

(65) Prior Publication Data
US 2008/0230176 A1 Sep. 25, 2008

(30) Foreign Application Priority Data
Jan. 19, 2004 (NL) .................................... 1025282

(51) Int. Cl.
*B29C 51/16* (2006.01)
*B29C 51/14* (2006.01)
*B29C 47/00* (2006.01)
*B29C 65/00* (2006.01)
*B32B 37/00* (2006.01)
*B32B 38/04* (2006.01)
*B65D 1/34* (2006.01)
*B65D 6/04* (2006.01)
*B65D 85/84* (2006.01)
*A21D 10/02* (2006.01)
*B65D 81/34* (2006.01)
*B65D 77/20* (2006.01)
*H05B 6/80* (2006.01)

(52) U.S. Cl.
USPC ........... 156/245; 156/212; 156/224; 156/252; 156/272.2; 206/564; 206/524.4; 426/107; 426/114; 219/728; 219/730

(58) Field of Classification Search
USPC .......... 156/60, 182, 196, 210, 211, 212, 221, 156/222, 224, 228, 242, 245, 250, 252, 256, 156/263, 269, 272.2, 272.4, 285, 295, 156/308.2, 309.6, 324.4; 206/524.1, 524.4, 206/557, 558, 561, 564; 426/106, 107, 109, 426/112, 113, 114; 219/678, 725, 728, 729, 219/730
See application file for complete search history.

(56) References Cited

U.S. PATENT DOCUMENTS 3,219,460 A * 11/1965 Engene ......................... 426/107
3,302,532 A 2/1967 Fichtner
(Continued)

FOREIGN PATENT DOCUMENTS

CA 1 082 655 7/1980
DE 44 15 226 A1 7/1995
(Continued)

*Primary Examiner* — Philip Tucker
*Assistant Examiner* — Brian R Slawski
(74) *Attorney, Agent, or Firm* — Wood, Phillips, Katz, Clark & Mortimer

(57) ABSTRACT

The invention relates to a method for producing self supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of providing a multilayer foil comprising said microwave radiation-influencing material layer and at least one material layer that does not influence microwave radiation, which is bonded thereto on at least one side of the microwave radiation-influencing material layer, bonding one side of the multilayer foil to a remaining portion of the container part in question, in such a manner that the material layer of the multilayer foil that does not influence microwave radiation is present on a free surface of the container part. The invention furthermore provides a container part thus produced, a method for producing a multilayer foil provided with holes and a multilayer foil thus produced.

41 Claims, 6 Drawing Sheets

(56) References Cited

U.S. PATENT DOCUMENTS

| | | | |
|---|---|---|---|
| 3,302,632 A * | 2/1967 | Fichtner | 219/728 |
| 3,865,301 A | 2/1975 | Pothier et al. | |
| 4,081,646 A | 3/1978 | Goltsos | |
| 4,496,815 A | 1/1985 | Jorgensen | |
| 4,626,641 A | 12/1986 | Brown | |
| 4,686,076 A | 8/1987 | Dromigny et al. | |
| 4,851,631 A | 7/1989 | Wendt | |
| 4,866,234 A | 9/1989 | Keefer | |
| 4,868,033 A * | 9/1989 | Nakano et al. | 428/201 |
| 4,972,059 A | 11/1990 | Wendt et al. | |
| 5,095,186 A | 3/1992 | Russell et al. | |
| 5,126,518 A | 6/1992 | Beckett | |
| 5,221,419 A | 6/1993 | Beckett | |
| 5,270,066 A | 12/1993 | Pawlowski | |
| 5,331,135 A | 7/1994 | Ovadia | |
| RE34,829 E | 1/1995 | Stone | |
| 5,593,610 A * | 1/1997 | Minerich et al. | 219/728 |
| 5,910,268 A | 6/1999 | Keefer | |
| 6,102,281 A * | 8/2000 | Lafferty et al. | 229/185.1 |
| 6,188,055 B1 | 2/2001 | Walters | |
| 6,259,079 B1 | 7/2001 | Ji et al. | |
| 6,359,272 B1 | 3/2002 | Sadek et al. | |
| 6,501,059 B1 * | 12/2002 | Mast | 219/730 |
| 6,903,320 B2 | 6/2005 | Cutler et al. | |
| 2004/0238535 A1 * | 12/2004 | Mast | 219/730 |
| 2009/0047525 A1 * | 2/2009 | Tilton | 428/441 |

FOREIGN PATENT DOCUMENTS

| | | | |
|---|---|---|---|
| EP | 0 206 811 A2 | 12/1986 | |
| EP | 0 342 571 A1 | 11/1989 | |
| EP | 0 350 056 A2 | 1/1990 | |
| EP | 0 350 660 A2 | 1/1990 | |
| EP | 0 421 710 A2 | 4/1991 | |
| EP | 0 790 123 A2 | 8/1997 | |
| EP | 0 875 468 A1 | 11/1998 | |
| EP | 0 916 594 A2 | 5/1999 | |
| EP | 1 029 805 A1 | 8/2000 | |
| FR | 2 598 650 | 11/1987 | |
| JP | 51098779 A * | 8/1976 | B29C 17/10 |
| JP | 53005284 A * | 1/1978 | B32B 15/08 |
| JP | 11138738 A * | 5/1999 | B41C 1/14 |
| WO | WO 88/05249 | 7/1988 | |
| WO | WO 92/19511 | 11/1992 | |
| WO | WO 98/33724 | 8/1998 | |
| WO | WO 01/53167 A1 | 7/2001 | |
| WO | WO 03/009997 A1 | 2/2003 | |
| WO | WO 03/043474 A2 | 5/2003 | |
| WO | WO 03/078012 A1 * | 9/2003 | A63H 33/00 |

* cited by examiner

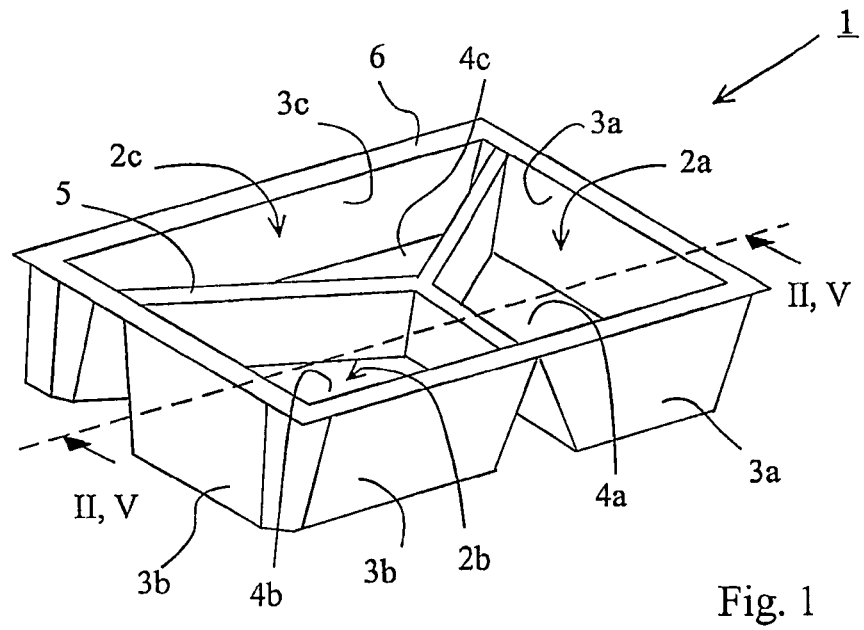
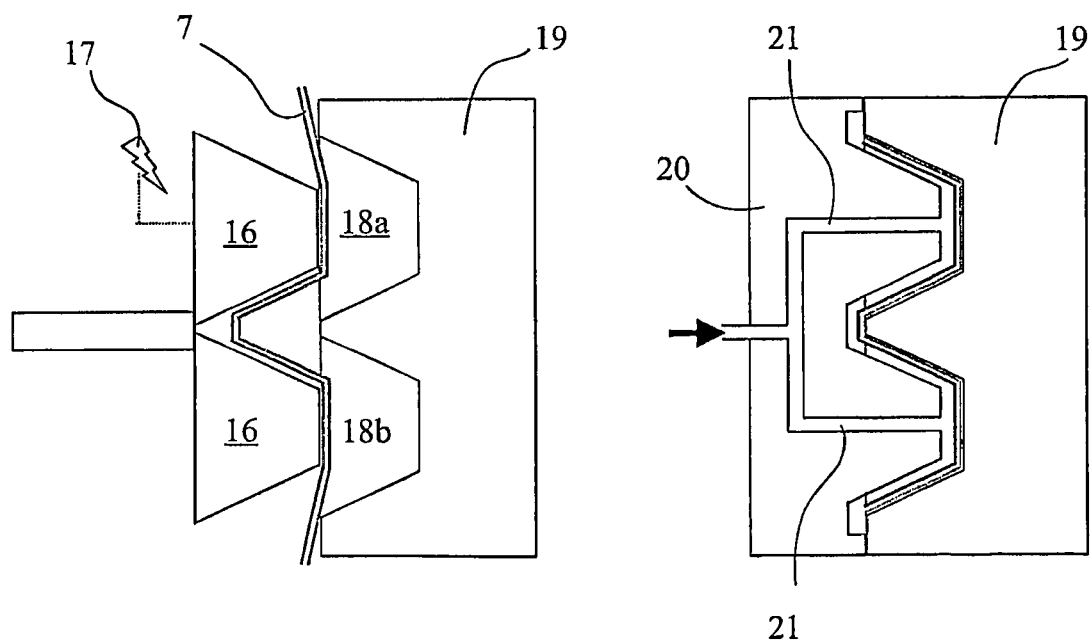
Fig. 1
Fig. 2a        Fig. 2b

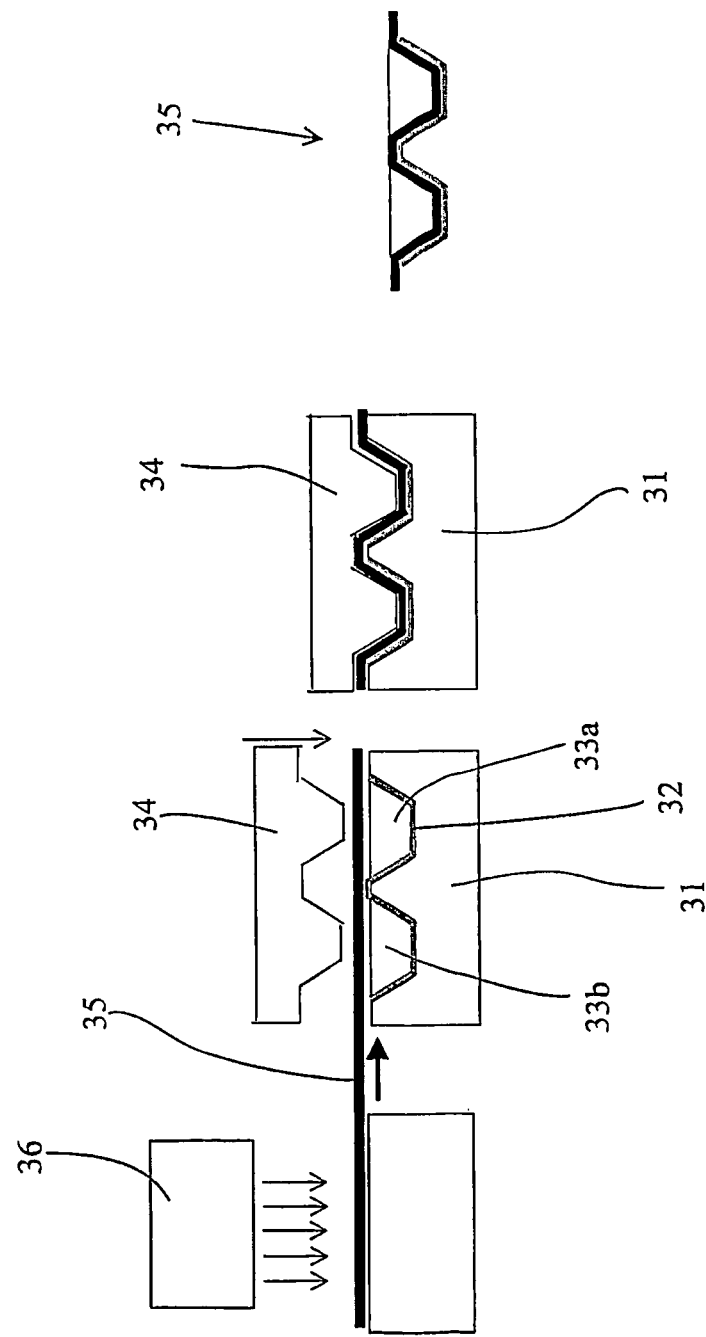

METHOD FOR PRODUCING CONTAINER PARTS, CONTAINER PARTS, METHOD FOR PRODUCING A MULTILAYER FOIL, MULTILAYER FOIL

The present invention relates to a method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave radiation-radiation influencing material layer is provided in the wall of at least one associated container part.

It is known to provide containers for foodstuffs to be treated in a microwave oven with two or more compartments. Each compartment is intended for receiving a food component of a meal. To ensure that said food components are optimally heated when they are jointly subjected to the radiation of a microwave oven, the walls and the bottoms of the compartments are provided with material layers that influence microwave radiation, each layer providing a different effect. This makes it possible to achieve that a food component in one compartment will be exposed to a different amount of microwave radiation than a food component in another compartment.

A method as referred to in the introductory paragraph is described in International patent application WO-A2-03/043474. In this known method, an aluminium foil is positioned between two pre-formed, nestable, self-supporting partial containers, which are moved together, causing the aluminium foil to be deformed and to be incorporated between the nesting partial containers. The two partial containers with the aluminium foil present therebetween form a dish or a cover of a container for foodstuffs to be treated in a microwave oven. To preform the aluminium foil into a sheet-like material that influences microwave radiation, if desired, it is suggested in said patent to incorporate said material in one or more of the partial containers by means of in-mould labelling techniques during the production of said partial container.

Container parts produced in this manner are very suitable for forming part of a container for foodstuffs to be treated in a microwave oven. In practice, however, it appears to be difficult to realise an economically sound mass production of such container parts, also because it is an intrinsic aspect of said method that there are two self-supporting partial containers for each container part. The object of the invention is to provide a method which makes it possible to produce container parts for containers for foodstuffs to be treated in a microwave oven in an economically sound manner. In order to accomplish that object, the method according to the invention comprises the steps of providing a multilayer foil comprising said microwave radiation-influencing material layer and at least one material layer that does not influence microwave radiation, which is bonded thereto on at least one side of the microwave radiation-influencing material layer, bonding one side of the multilayer foil to a remaining portion of the container part in question, in such a manner that the material layer of the multilayer foil that does not influence microwave radiation is present on a free surface of the container part.

The use of such a multilayer foil makes it possible, in a manner that is very advantageous from a production point of view, to have the microwave radiation-influencing material layer form part of a container part. The material layer that does not influence microwave radiation shields the microwave radiation-influencing material layer from its environment, so that the microwave radiation-influencing layer is not present on a free surface of the container part, which is undesirable from a viewpoint of food safety and because of the risk that damage would be caused to the microwave radiation-influencing layer. In addition, the microwave radiation-influencing material layer can thus be hidden from view, if desired, through the use of a non-transparent material layer that does not influence microwave radiation, without ruling out the possibility that, on the contrary, the microwave radiation-influencing material layer is exposed to view because of the fact that the material layer that does not influence microwave radiation is transparent. The layer that does not influence microwave radiation might also be used for providing information, for example printed information, thereon.

It is furthermore noted that International patent application WO-A1-03/078012 describes a method for producing self-supporting container parts for containers for foodstuffs to be treated in a microwave oven, in which the container is made up substantially of a folded sheet of a laminated material, wherein parts of the container, such as flanges, edges, projections and handles, are encapsulated by an injection-moulded plastic material.

Preferably, the multilayer foil is bonded to the remaining portion of the container part in such a manner that the material layer, or at least one material layer, of the multilayer foil that does not influence microwave radiation is present on the outer side of the container part. Within the context of the present preferred embodiment, the term outer side is to be understood to be the side of the container part that will be remote from the foodstuffs in the container in the final container. This preferred embodiment strongly reduces or practically excludes the risk of food coming into contact with the microwave radiation-influencing material layer, even if the material layer that does not influence microwave radiation should be damaged, which contact is or at least may be undesirable for reasons of food safety. On the outer side, the material layer of the multilayer foil that does not influence microwave radiation provides a mechanical protection for the microwave radiation-influencing foil.

In a very suitable preferred embodiment of the invention for mass-producing container parts, the step of bonding the multilayer foil to the remaining portion of the container part is carried out by positioning the multilayer foil inside the mould during the forming of a container part in said mould for the purpose of bonding the microwave radiation-influencing material layer to the remaining portion of the container part during said forming of the container part. Such a method falls under the category in-mould labelling technology (IML), wherein a foil is typically placed in a mould. In one production step, the container part with the microwave radiation-influencing material layer integrated therein is thus produced or at least shaped. Within the framework of this preferred embodiment it is also possible to position a number of separate multilayer foils simultaneously in the injection mould for the purpose of producing container parts comprising various compartments.

The in-mould labelling technology may be used upon injection-moulding the container parts, which makes it possible to produce such container parts in large numbers at low production costs. Consequently, a preferred embodiment of the method according to the invention comprises the step of forming the container parts by injection-moulding the container parts in an injection mould. The bonding of the microwave radiation-influencing material layer to the remaining portion of the container part takes place during solidification of the injection moulding material in the injection mould.

Within the context of the present invention, another very advantageous embodiment of the in-mould labelling technology is formed by a thermoforming process, which includes both vacuum forming and pressure forming. Accordingly, an alternative preferred embodiment of the method according to the invention comprises the step of forming the container parts by thermoforming the container parts in a thermoforming mould.

Alternatively it is also possible to carry out the step of joining the multilayer foil to the remaining portion of the container part by glueing the multilayer foil to the remaining portion of the container part by means of an adhesive layer outside a mould. Also this method, which can be generally referred to as Off Mould Labelling (OML), is suitable for the mass production of container parts comprising at least one microwave radiation-influencing material layer.

Although it is certainly possible within the context of the aforesaid preferred embodiment to have said glueing of the multilayer foil to the remaining portion of the container part take place when the container part has already reached its final shape to a significant extent, it may also be advantageous not to give the container part its essentially definitive shape by thermoforming the container part in a thermoforming mould until the multilayer foil has been glued onto the remaining portion of the container part. The accessibility of the remaining portion of the container part for glueing the multilayer foil thereon is still optimal when the forming of the container part has not taken place yet. In case problems should occur as regards the quality of the bond between the multilayer foil and the remaining portion of the container part due to the subsequent deformation of the container part into its final shape, it may be considered to glue the multilayer foil onto the material of the container part only at those locations where no deformations occur or at least not to an objectionable extent that would lead to bonding phenomena.

Preferably, the microwave radiation-influencing material layer is provided with holes. The size and the distribution of the holes partially determine the effect of the microwave radiation-influencing material layer which is quite preferably flat and/or originally made of a nonwoven material and/or made in one piece (i.e. one conductor).

Although it is possible to use a number of discrete material foils for different compartments for each container part, as already indicated above, it may also be very advantageous if the holes in the microwave radiation-influencing material layer are provided in different patterns and/or in different sizes for different compartments. Providing the holes in different patterns and/or different sizes achieves that in spite of the fact that only one foil is used, said foil will eventually provide locally different effects for each compartment.

Quite preferably, the material layer that does not influence microwave radiation is a closed layer. In general it can be said that the material layer that does not influence microwave radiation can function as an adequate protection, in particular of a mechanical nature, for the microwave radiation-influencing material layer in that case. Especially if the connection between the multilayer foil and the remaining portion of the container part in question is effected by means of an injection-moulding process in accordance with a preferred embodiment of a method according to the invention as discussed above, the closed material layer that does not influence microwave radiation can function to prevent injection moulding material finding its way between the wall of the injection mould and the multilayer foil, thereby pushing aside the multilayer foil, which may even lead to the risk of the microwave radiation-influencing material layer rather than the material layer that does not influence microwave radiation being positioned on a free surface of the container part, which is precisely what is undesirable within the context of the present invention.

Further preferably, the multilayer foil is provided with through holes. Such holes are thus present both in the microwave radiation-influencing material layer and in the material layer that does not influence microwave radiation. An important advantage of the use of such a multilayer foil is the fact that it is easy to produce, or at least easier than a multilayer foil of which only the microwave radiation-influencing material layer is provided with holes. In addition to that, when an in-mould labelling production process is used for bonding the multilayer foil to the remaining portion of a container part, the use of a multilayer foil provided with holes has this major advantage that the integration of the multilayer foil in the container part will in any case take place via the holes in the multilayer foil.

The holes in the microwave radiation-influencing material layer are preferably formed in the same production line as the production line in which the multilayer foil is bonded to the remaining portion of the container part in question. This is advantageous in particular from a logistic point of view, since there is no need to store and transport the multilayer foil with holes present therein.

In order to make it possible to give the microwave radiation-influencing material layer in the container part a three-dimensional shape corresponding to that of a (portion of) the associated compartment without foil portions overlapping (or at least to a significantly smaller extent), the multilayer foil preferably comprises cut-out corner portions.

In particular, but not exclusively so, in the situation in which the container parts are produced by means of an in-mould labelling production process, it is preferable to provide the multilayer foil in a condition in which a material layer that does not influence microwave radiation is present on either side of the microwave radiation-influencing material layer. The second material layer that does not influence microwave radiation can thus provide a good bond with the remaining portion of the container part. Because the function of the second material layer that does not influence microwave radiation is different from that of the (first) material layer that does not influence microwave radiation, the thickness of said second material layer may be (considerably) smaller. In the case of IML thermoforming it is advantageous if the second material layer that does not influence microwave radiation made of polyethylene, because of the advantageous flow properties thereof (polyethylene reaches its yield point sooner than polypropylene).

Another function of the use of a multilayer foil in which a material layer that does not influence microwave radiation is present on either side of the microwave radiation-influencing material layer is to prevent coating glues, which are used for bonding together the various layers of the multilayer foil, at least one of which layers is provided with holes, from landing on the outer side of the foil, which might lead to problems if the foil in question is wound into a roll, because such a roll will be difficult to unwind at a later stage because the fact that adjacent layers of multilayer foil in the roll undesirably adhere together. This advantage is achieved in particular if the two material layers that do not influence microwave radiation are closed layers.

Depending on the production technique that is used for the processing of the multilayer foil and on the material of the respective material layers that do not influence microwave radiation, it may be very advantageous, or even necessary, to detach one of the two material layers that do not influence microwave radiation from the multilayer foil before the multilayer foil is bonded to the remaining portion of the container part. One can imagine in this context that the material layer that does not influence microwave radiation in question is pulled off the remaining portion of the multilayer foil in the same way as a sticker, as it were. Suitable glue types must be used for this purpose, of course, which glue types are known to those skilled in the art. An important example of the present preferred embodiments is the use of polyethylene and polypropylene as respective materials for the outer layers of a multilayer foil, between which layers the microwave radiation-influencing material layer, for example consisting of aluminium, is present. The polyethylene layer is not suitable for being bonded to the remaining portion of our polypropylene container part by means of IML injection-moulding, and consequently it is advantageous to remove the polyethylene layer from the multilayer foil. It is advantageous in that case to use an additional polypropylene layer between the polyethylene layer and the aluminium layer in the multilayer foil, so as to provide an optimum bond to the remaining portion of the polypropylene container part via the polypropylene layer during the IML injection moulding process. On the other hand, the presence of an outer polyethylene layer may be advantageous when other production techniques are used, such as a thermoforming technique.

In particular with a view to obtaining a good bond between the multilayer foil and the remaining portion of the container part it is furthermore preferable for the material layer(s) that do not influence microwave radiation to be made of the same material as the remaining portion of the container part. This preferred embodiment in particular applies when an IML injection moulding process is used.

According to a special preferred embodiment, the upper side of a compartment of a container, after being filled with a foodstuff, is covered with a further multilayer foil comprising a further microwave radiation-influencing material layer and at least one material layer that does not influence microwave radiation, which is bonded thereto on one side of said further microwave radiation-influencing material layer, in such a manner that said further microwave radiation-influencing material layer of said further multilayer foil is present on the side remote from the interior of the filled compartment of said further material layer that does not influence microwave radiation. This is an entirely novel application of a multilayer foil, and it is noted that within the context of the present invention said further multilayer foil may correspond exactly to the multilayer foil that has been bonded to the remaining portion of a container part in accordance with the main aspect of the present invention, but that it may also have a slightly different structure. One wall of a container part of the container in question may even be provided with a microwave radiation-influencing material layer different from the layer that is used according to the main aspect of the present invention. Thus, a method would be provided for producing self-supporting container parts, such as dishes or covers, for containers for foodstuffs to be treated in a microwave, said containers each comprising at least one compartment for receiving the foodstuffs, wherein preferably a microwave radiation-radiation influencing material layer is provided in the wall of at least one associated container part along at least part of the circumferential surface of said at least one compartment, wherein, after a compartment of a container has been filled with a foodstuff, the upper side of said compartment is covered with a further multilayer foil comprising a further microwave radiation-influencing material layer and at least one material layer that does not influence microwave radiation, which is bonded thereto on one side of said further microwave radiation-influencing material layer, in such a manner that said further microwave radiation-influencing material layer of said further multilayer foil is present on the side remote from the interior of the filled compartment of said further material layer that does not influence microwave radiation. An important advantage of the use of said further multilayer foil according to the present preferred embodiment for covering the upper side of a filter compartment is the fact that in principle it obviates the need to use covers comprising a microwave radiation-influencing material layer. For example, it is conceivable to use a dish whose compartments are covered with a further multilayer foil, which dish is packaged in a cardboard wrap. Alternatively it is conceivable to use a collection of separate dishes, each comprising a single compartment filled with a food component, which food components together form a meal, which dishes are jointly packaged in one (cardboard or plastic) package, for example in the form of a tray.

Preferably, said further multilayer foil is directly bonded to an upper circumferential edge of the filled compartment. Said bonding may be effected by means of a sealing technique (melted joint) or by means of a glue, for example. In the case of a melted joint it stands to reason that said further multilayer foil must be suitable for such use.

In another preferred embodiment, in order to make it possible to use non-sealable multilayer foils, said further multilayer foil is glued onto a separate sealing foil, which is directly bonded to an upper circumferential edge of the filled compartment. The direct bond between the sealing foil and the circumferential edge may have been effected by means of a melted joint or a glued joint in this case as well.

With a view to enabling automated manipulation of the multilayer foil, in particular for placing the same in a mould, it is very advantageous if the multilayer foil is electrostatically chargeable, which can be realised by forming one layer or a number of layers of the multilayer foil of a polypropylene that is electrostatically chargeable.

The present invention also relates to a container part obtained by using the methods according to the invention as described above.

According to a preferred embodiment, such a container part is provided with connecting means for being interconnected with other container parts. Such a preferred embodiment is advantageous in particular if the container part in question comprises only one compartment. This enables consumers to compose the food components for a microwave meal themselves. Such container parts may be provided in a limited number of forms, e.g. a 60° segment of a circle, a 120° segment of a circle and a 180° segment of a circle. Depending on the food content of the compartments of said container parts, said container parts should be available in a limited number of embodiments, which are different from each other as regards the nature of the microwave radiation-influencing material layer thereof. Three mutually different microwave radiation-influencing material layers that are available may be considered in this connection, which material layers differ from each other as regards the size of the holes or the pattern of holes therein, for example. In addition to that, container parts that do not comprise a microwave radiation-influencing material layer might be available. The production of container parts may thus be confined to (four times three is) twelve different container parts, which can be combined in a large number of different ways by consumers. If all these combinations should be combined into one single container part, a lot more than twelve such single container parts would have to be available, which would render the production process of such container parts and the associated logistic process considerably more complex.

Preferably, the microwave radiation-influencing material layer comprises aluminium. Aluminium is a material that is capable of influencing microwave radiation in a very suitable manner.

The at least one material layer that does not influence microwave radiation preferably comprises polypropylene, which material has a low cost price but which is nevertheless quite suitable for use as the material for a container part.

Alternatively it may also be very advantageous if the at least one material layer that does not influence microwave radiation comprises paper. Paper, such as cardboard, has this advantage that it can easily be printed, so that the provision of the microwave radiation-influencing material layer on the container part may be combined with the provision of information thereon. The use of paper is in particular interesting if the container parts are formed by means of a thermoforming process.

The present invention is very suitable for using relatively thin microwave radiation-influencing material layers, which is advantageous from a viewpoint of material consumption and, related thereto, cost price. Accordingly, a preferred embodiment of a container part according to the invention is characterized in that the microwave radiation-influencing material layer has a thickness of maximally 50 μm, more preferably maximally 30 μm. The lower limit of the thickness of the microwave radiation-influencing material layer is on the one hand determined by the forces acting on the microwave radiation-influencing material layer during the production process of the container parts, since there is a risk that the microwave radiation-influencing material layer will tear if an insufficient thickness is used. In addition to that, the thickness of the microwave radiation-influencing material layer must also be sufficient in order for said layer to actually influence microwave radiation. It is realistic in this connection to maintain a lower limit of 5 μm for aluminium.

Preferably, the multilayer foil has a thickness of maximally 200 μm, more preferably maximally 100 μm. A foil having such a maximum thickness is easy to process, in particular in the IML injection-moulding process.

Especially if a container part comprises a number of compartments, the container part is preferably provided with legs via which the container part can rest on a supporting surface. This applies in particular if the container parts are dishes. Thus, the extent to which heat exchange takes place between various compartments via such a supporting surface while a meal is being heated in a microwave oven will be significantly reduced.

Another manner of preventing heat exchange from taking place between various compartments is obtained if, in accordance with a preferred embodiment of the invention, means for connecting the container part to an associated other container part are provided along the circumferential edge of at least two compartments. Concretely, a dish and an associated cover may be considered in this connection, which dish and which cover are provided with a snap connection edges along the circumferential edges of the compartments. Thus an airtight closure is obtained between the compartments. Alternatively, or in combination, it is also possible to seal the compartments of a dish with a foil (that does not influence microwave radiation) along the upper circumferential edges of the compartments, as a result of which a suitable gas can be introduced into a compartment, for example, for extending the storage life of a full product present in a compartment.

The present invention also relates to a method for producing a multilayer foil provided with holes for use with a method for producing container parts as described above. The method according to the invention comprises the steps of providing a closed multilayer foil not provided with holes,
die-cutting the holes in the multilayer foil.

Said die-cutting, in particular rotary die-cutting, is a production technique that is highly suitable for mass production.

Alternatively, such a method comprises the steps of
providing a closed multilayer foil not provided with holes,
cutting the holes in the multilayer foil by means of a laser beam.

The major advantage that is achieved by laser cutting the holes in the multilayer foil is the flexibility with which the holes can be provided, both as regards their size and as regards the pattern in which they are provided.

With regard to the above described preferred embodiments of a method for producing a multilayer foil provided with holes it can be stated that the closed multilayer foils as provided may be provided with material layers that do not influence microwave radiation on one side of the microwave radiation-influencing material layer or on both sides of the microwave radiation-influencing material layer.

The present invention also relates to a method for producing a multilayer foil, comprising the steps of
providing a microwave radiation-influencing material layer,
forming holes in said microwave radiation-influencing material layer,
glueing a closed material layer that does not influence microwave radiation onto one side of the microwave radiation-influencing material layer.

Thus it is possible to produce a multilayer foil which, on account of the closed nature of the material layer that does not influence microwave radiation, is in particular suitable for IML injection-moulding container parts, without there being a risk of injection-moulding material finding its way between the IML multilayer foil and the wall of the injection mould. On the other hand, there is complete freedom in forming the holes in the microwave radiation-influencing material layer.

Another method that can be used within the framework of the present invention for producing a multilayer foil comprises the steps of
providing a microwave radiation-influencing material layer,
forming holes in said microwave radiation-influencing material layer,
glueing a closed material layer that does not influence microwave radiation onto both sides of the microwave radiation-influencing material layer.

A multilayer foil produced in this manner is very suitable for being rolled up, because of the fact that the closed nature of the two material layers prevents (coating) glue from landing on the outer side of the multilayer foil via the holes in the microwave radiation-influencing material layer.

With regard to the forming of holes in the microwave radiation-influencing material, it may generally be advantageous to glue a strengthening layer onto the microwave radiation-influencing material layer before holes are formed in the microwave radiation-influencing material layer. The manipulation and processing of the microwave radiation-influencing material layer for forming holes therein can thus be facilitated.

Preferably, in order to facilitate the forming of holes in the microwave radiation-influencing material layer, holes corresponding to the holes in the microwave radiation-influencing material layer are formed in the strengthening layer concurrently with the forming of holes in the microwave radiation-influencing material layer.

When a method for producing a multilayer foil is used that in any case comprises the step of glueing a closed material layer that does not influence microwave radiation onto both sides of the microwave radiation-influencing material layer, one of the closed material layers that do not influence microwave radiation is according to a preferred embodiment glued with a glue type that allows subsequent breaking of the glued joint so as to make it possible to separate the respective closed material layer that does not influence microwave radiation from the remaining portion of the multilayer foil at a later stage. This preferred embodiment is connected with the fact that at least one of the two material layers that do not influence microwave radiation, once it has been unwound from a roll, may in fact stand in the way of the further processing of the multilayer foil for incorporation thereof into a container part, as already explained above in the description of a preceding preferred embodiment of a method for producing self-supporting container parts.

Finally, the present invention also relates to a multilayer foil produced by using a method as described above.

The invention will now be explained in more detail by means of the description of a non-limitative preferred embodiment thereof, in which reference is made to the following figures:

FIG. 1 shows a microwave dish;

FIGS. 2A and 2B show two successive situations in an injection mould during the production of a microwave dish according to FIG. 1, at the location of plane II in FIG. 1;

FIG. 9 shows successive situations during the pressure-moulding of container parts;

Figure 10:
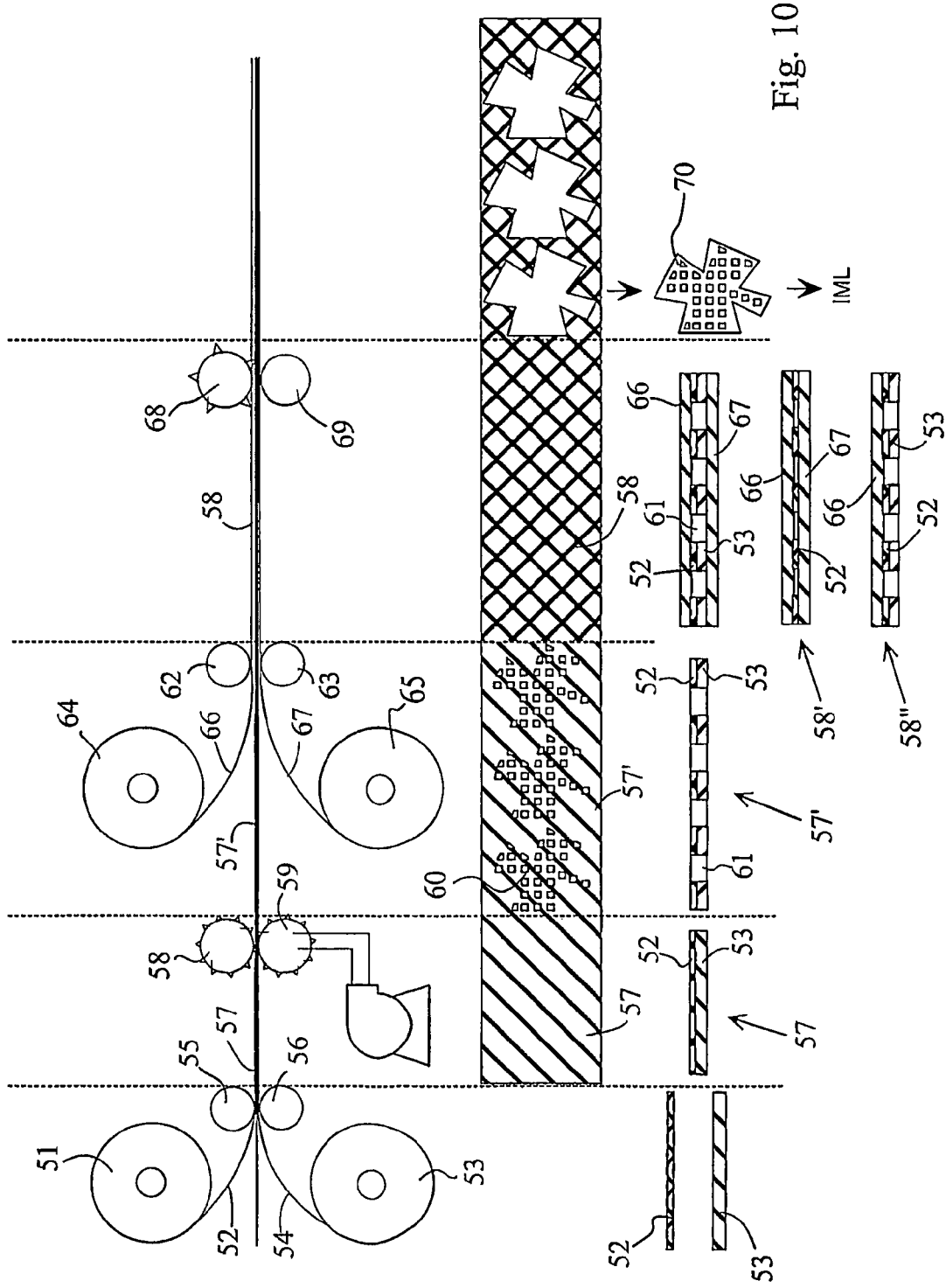

FIG. 10 schematically shows a method for producing a multilayer foil.

FIG. 1 shows a dish or a plate 1 comprising three compartments 2a, 2b, 2c (to be jointly referred to below as compartments 2). The dish 1 is made of a plastic material, such as polypropylene. Each compartment is intended for receiving a food component, which food components jointly form a meal after being treated in a microwave oven. Each compartment has a number of vertical walls 3a, 3b, 3c (to be jointly referred to below as walls 3), which slope upwards in a direction away from each other, said walls being interconnected along their bottom edges via the respective bottoms 4a, 4b, 4c (to be jointly referred to below as bottoms 4). The facing walls 3 of the three compartments are not common walls, so that no heat exchange can take place between the compartments in question via such a common wall 3. The facing walls of different compartments 2 are interconnected along their upper edges via elongated connecting edges 5. The dish 1 is furthermore provided with a flanged edge 6 along its upper circumference. By designing the flanged edge 6 to have a suitable width and/or not providing it with a microwave radiation-influencing layer on the outer side over a suitable width, as will become apparent hereinafter yet, sparking between the wall of the microwave oven and the dish 1 can be prevented. Alternatively, spacers might be locally provided at the location of the flanged edge 6.

In order to achieve that the food components in the three compartments 2a, 2b, 2c are affected by the microwave radiation to a different extent, a sheet-like microwave radiation-influencing layer is present in the walls 3a, 3b and also in the bottoms 4a, 4b. The walls 3c and the bottom 4c of the compartment 2c do not comprise such a microwave radiation-influencing layer. The material of such a layer is aluminium, for example, but alternatively it would also be possible to use other types of material that conduct electricity well, such as silver, copper, gold, zinc, brass, nickel, iron, platinum, tin or certain types of composites. Aluminium stands out in this connection in particular because of the relatively low cost price thereof in combination with its advantageous electrical conductivity properties.

Figure 5:
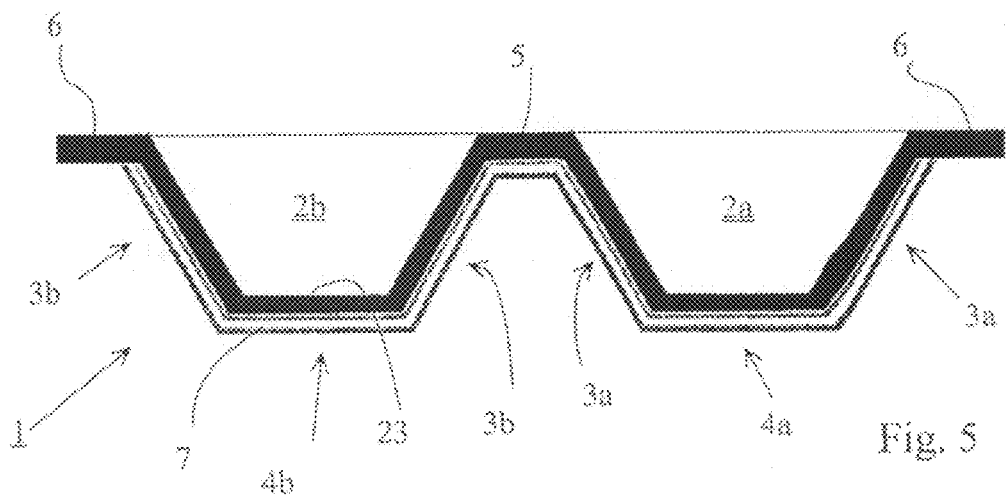
FIG. 5 is a cross-sectional view along plane V in FIG. 1.
Figure 6:
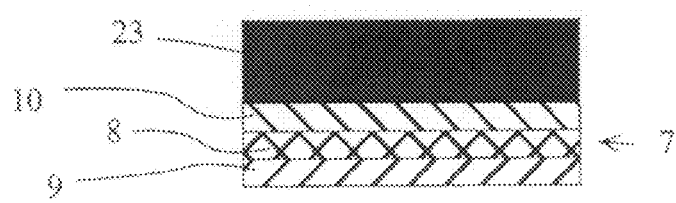
FIG. 6 is a more detailed view of the bottom of a compartment in FIG. 5.

According to a preferred embodiment of the invention, the dish 1 has been produced by means of an injection moulding technique, using the so-called in-mould labelling technique (IML), in which typically a foil is present in the mould, the multilayer foil being positioned therein by a pick-and-place robot (not shown). In connection with the manipulation by the pick-and-place robot, it is strongly preferred if the multilayer foil in question is electrostatically chargeable, for example in that it comprises a polypropylene layer of the type that is electrostatically chargeable, which is not the case with all types of polypropylene. With regard to the production method, reference is first made to FIGS. 2a-4, whilst FIGS. 5 and 6 schematically show the dish 1 thus produced in cross-sectional view.

Figure 3:
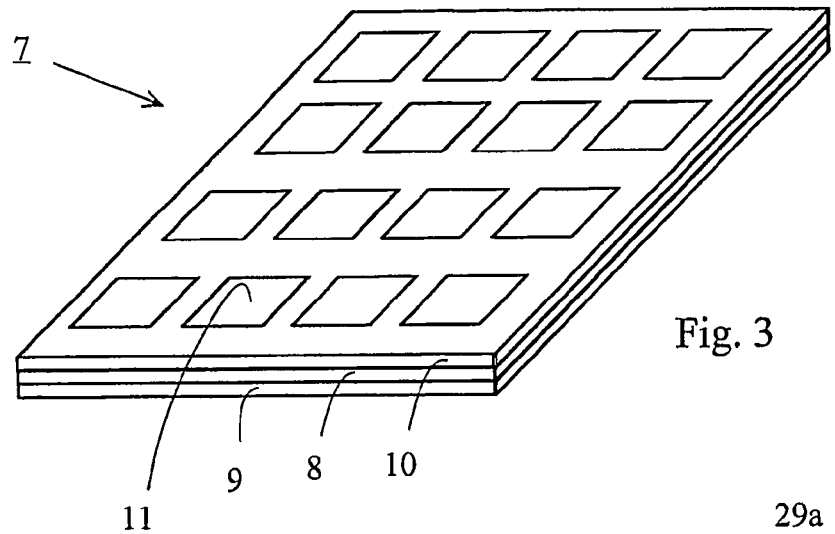
FIG. 3 is a perspective view of a multilayer foil.

FIG. 3 shows a multilayer foil 7. The multilayer foil 7 is built up substantially of three layers, the middle layer 8 of which is the aluminium microwave radiation-influencing layer, which is on either side provided with a layer of polypropylene layer 9, 10, which material corresponds to the material of the remaining portion of the dish 1. Although polypropylene is a very suitable type of plastic, in particular because of its cost price, also other types of plastic may be used, such as ABS, polyethylene and polystyrene, as will be understood by those skilled in the art. The thickness of the material layers 8, 9, 10 is 20 μm, 30 μm and 30 μm, respectively. The advantage of the symmetrical thickness distribution of the layers is the fact that this rules out the possibility of "errors" occurring as regards the question which material layer 9 or 10 is present on the outer side (provided of course that said material layers consist of the same material). Purely as far as the mechanical protection function of the material layer 9 with respect to the material layer 8 is concerned, it would also be possible to use a smaller thickness of the layer 9 of minimally 5 μm. It is also possible to use a greater thickness, e.g. 50 μm or 100 μm, for the material layers 9, 10, although this would mean an over-dimensioning from the viewpoint of the shielding function thereof. A thickness other than 20 μm might be used for the material layer 8, e.g. a thickness generally ranging between 5 μm and 50 μm, the lower limit being determined by the strength of the material layer 8 required by the production process and the upper limit being determined by the requirement to keep the material consumption within bounds, inter alia for economic and environmental reasons.

Although it is possible within the framework of the invention to provide a separate multilayer foil 7 for each of the compartments 2a and 2b, which are each provided with a microwave radiation-influencing aluminium layer 8, in this case a single multilayer foil 7 is used, via which both compartments 2a and 2b will be provided with a microwave radiation-influencing aluminium layer. To that end, the multilayer foil consists of two main portions 12a, 12b, which are interconnected via the connecting edge 13, which will eventually be present at the connecting edge 5 between the compartments 2a and 2b. Each main portion 12a, 12b comprises a central bottom surface 14a, 14b, with side faces 15a, 15b joining the four circumferential edges thereof. The side faces 15a, 15b, can be folded upwards about the circumferential edges of the bottom surfaces 14a, 14b, which in part function as fold lines, so that the multilayer foil 7 takes the main shape of a compartment 2a, 2b, with the facing edges of adjacent side faces 15a, 15b overlapping to a limited extent, to which end the multilayer foil 7 comprises cut-out corner portions 29a, 29b.

The main portions 12a, 12b are provided with square through holes 11a, 11b, which are different from each other both as regards their size and as regards their distribution. The final effect of this is that the multilayer foil 7 influences the microwave radiation for the food in the compartments 2a, 2b to a different extent for each compartment.

With regard to the multilayer foil 7 it is noted that it is made by applying a thin homogeneous layer of glue to the sides of the aluminium layer 8 and positioning the polypropylene layers 9, 10 thereon. The whole is definitively attached together by moving a roller over the foil 7 with a specific pre-pressure, thus pressing down the glued joints. The holes 11a, 11b in said foil 7, which thus not only extend through the aluminium layer 8 but also through the polypropylene layers 9, 10 thereof, can very advantageously be formed by means of a die-cutting operation or a laser beam cutting operation. The first possibility is in particular advantageous because of the low cost price thereof when large production numbers are concerned, whilst laser beam cutting provides the producer with a very high degree of flexibility.

The forming of the multilayer foil 7 takes place in the manner indicated in FIGS. 2a and 2b. Use is made of a double mandrel 16, which is electrostatically charged (17) for holding the multilayer foil 7, which is flat in the starting situation. The multilayer foil 7 is pressed into two recesses 18a, 18b of a mould section 19 by means of the mandrel 16, as a result of which the multilayer foil 7 takes the shape of the recesses 18a, 18b. After retraction of the double mandrel 16, the multilayer foil 7 remains behind in the recesses 18a, 18b. Subsequently, the positive mould section 20 comprising injection-moulding channels 21 is moved into adjoining relationship with the mould section 19 so as to create an injection mould 22 corresponding to the shape of the dish 1 between the negative mould section 19 and the positive mould section 20. Using an injection-moulding machine (not shown), liquefied polypropylene 23 is then introduced into the injection mould 22 via the injection-moulding channels 21, in which it subsequently solidifies, as a result of which the dish 1 is obtained, which will become available after the mould sections 19 and 20 have been moved apart. In the dish 1, the multilayer foil 7 is bonded to the remaining injection-moulding polypropylene material 23 over its entire area on one side. It is also conceivable for the multilayer foil to have dimensions such that a significant part thereof remains free beyond the injection-moulding polypropylene material 23, which part is eventually folded back over the compartments 2a-2c after said compartments have been filled so as to function as a cover for said compartments, as will be explained yet hereinafter.

Figure 7:
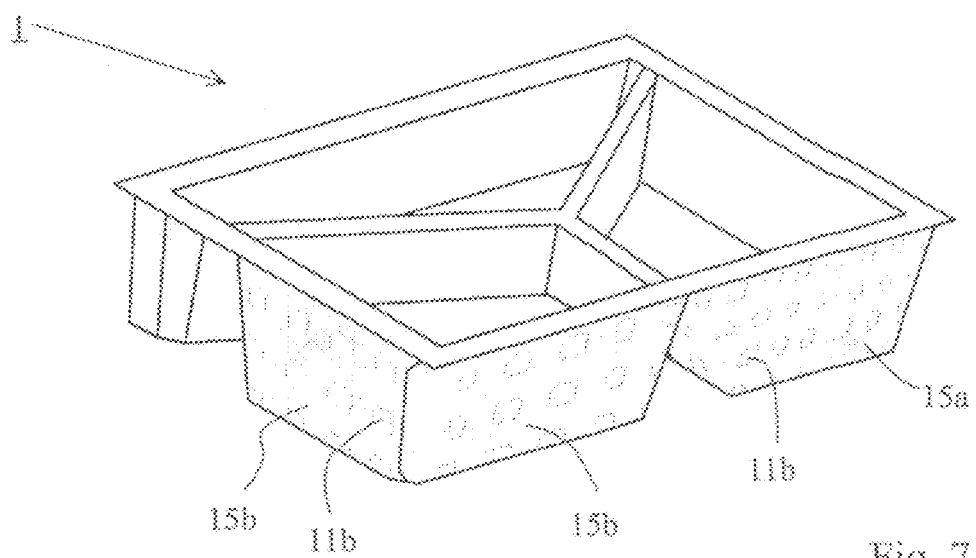
FIG. 7 shows the microwave dish of FIG. 1, in which the material layers that influence the microwave radiation are visualised.

Except for the multilayer foil 7, the injection-moulding material 23 is indicated in black in FIGS. 5 and 6. The thickness of the walls 3 and the bottoms 4 of the dish 1 is about 0.8 mm. Smaller thicknesses, e.g. of 0.2-0.3 mm, are also possible, without the self-supporting capacity of the dish 1 being lost, if use is made of stiffening ribs. Since the bottoms 4b and 4c have the same thickness and the polypropylene layer 9 of the original multilayer foil 7 is present on the free outer side of the dish 1, as a result of which the aluminium layer 8 is shielded, the consumer will hardly notice, if at all, that the compartment 2b is provided with a microwave radiation-influencing aluminium material layer 8, whereas the compartment 2c is not, assuming that a non-transparent polypropylene layer 9 is used. For the sake of clarity, however, the layer 8 is shown in FIG. 7 by representing the polypropylene layer 9 as being transparent, as it were.

Figure 8A:
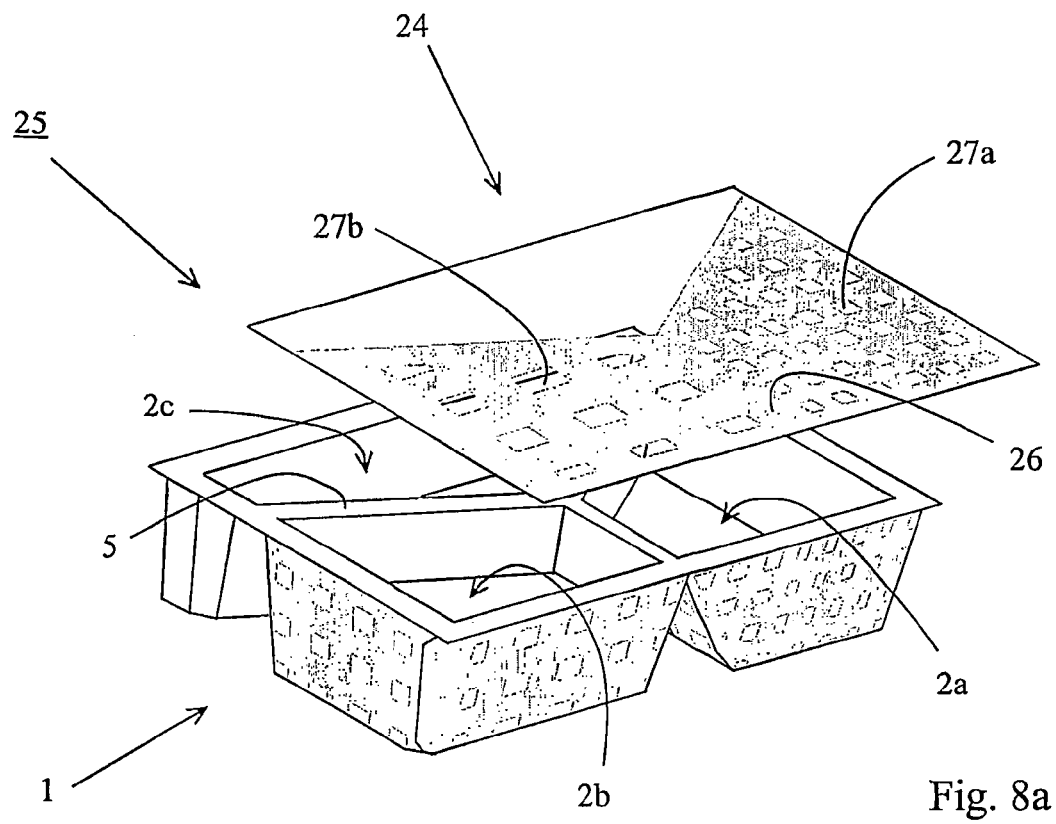
FIGS. 8A and 8B show the microwave dish of FIG. 7, including the associated cover.
Figure 8B:
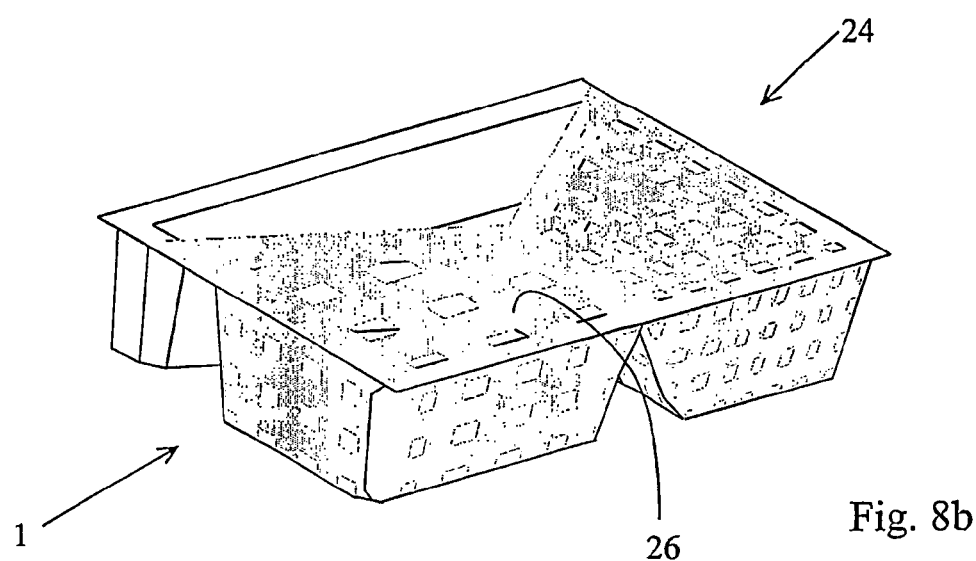

In FIGS. 8a and 8b the dish 1 is shown together with an associated cover 24. The dish 1 and the cover 24 together form a container 25. For the sake of clarity, the cover 24 is represented as being transparent, with the exception of the microwave radiation-influencing layer 26 with the holes 27a, 27b present therein. Just like the container 1, the cover 24 is subdivided into three parts for the respective components 2a, 2b, 2c. No microwave radiation-influencing layer is present at the location of compartment 2c, whilst on the other hand such a layer is present at the location of the compartments 2a, 2b. At the compartment 2a, the holes 27a of the aluminium layer 26 are spaced closer together and their dimension is smaller than that of the holes 27b, similar to the situation with the holes 11a-11b in the walls 3 and the bottoms 4 of the compartments 2a, 2b. Thus, two cages of Faraday are created for the compartments 2a and 2b, said cages having different properties with regard to the microwave radiation that can be barred from the interior of the compartments 2a, 2b. Like the dishes 1, the cover is 24 can be produced by means of the IML injection-moulding process, in which case only one multilayer foil needs to be available for each cover 24. Alternatively, the covers may be produced by means of a thermoforming process, for example, or multilayer foils may be used for sealing the compartments 2a, 2b, as will be discussed yet hereinafter.

Although this is not shown in FIGS. 1, 8a and 8b, a snap connection system may be provided on both the connecting edges 5 and the flanged edges 6 of the dish 1 on the one hand and on the corresponding positions on the side of the cover facing towards the dish 1 on the other hand, as a result of which the compartments 2 can be hermetically sealed from each other also at the location of the connecting edges 5, which is important on account of the fact that it is desirable to have a maximum freedom as regards the individual setting of the temperature inside the compartments. From this viewpoint it is also advantageous if the dish 1 is provided with legs at its bottom side, for example in each of the corner points of the bottoms 4, so that heat exchange cannot take place, or at least only to a significantly reduced extent, through heat conduction by the supporting surface of the dish 1 in a microwave. Such a supporting surface is usually a glass plate.

FIG. 9 shows an alternative way of producing dishes such as the dish 1 in FIG. 1, which likewise falls within the category of in-mould labelling technology. Use is made of a pressure mould 31, in which, similar to the method as explained with reference to FIGS. 2a, 2b, a multilayer foil 32, comparable to the multilayer foil 7, is provided in the recesses 33a, 33b. A pressure mould subsequently presses a polypropylene foil 35 into the recesses 33a, 33b. Prior to this, the foil 35 has been heated by heating means 36, as a result of which the polypropylene foil 35 and the multilayer foil 32 are bonded together in the recesses 33a, 33b, also under the influence of the elevated pressure. Subsequently, the polypropylene foil 35, insofar as it is present between the negative mould 31 and the positive mould 34, is cut off and an individual dish 35 has been obtained. Although it is indicated that the multilayer foil 32 may be configured similarly to the multilayer foil 7, it is also conceivable to configure the multilayer foil 32 without a polypropylene layer corresponding to the polypropylene layer 10 of the multilayer foil 7, or at least configure it with a layer which is even significantly thinner.

FIG. 10 schematically shows a manner of producing a multilayer foil suitable for use in the present invention. The upper part of FIG. 10 shows a schematic side elevation, the middle part shows a schematic top plan view and the lower part shows one sectional view, or a number of sectional views, perpendicular to the side elevation shown in the upper part of FIG. 10.

A layer of aluminium foil 52 (about 5-10 μm) and a layer of polypropylene foil 54 (about 25-35 μm), whose thickness is a number of times that of the layer of aluminium foil 52 in this case, are unwound from rolls 51, 53, respectively, and pressed against each other between rollers 55, 56. Supply means (not shown) have applied a coating glue to one of the facing sides of the layer of aluminium foil 52 and/or the layer of polypropylene foil 53, or to both sides, between the rolls 51, 53 and the rollers 55, 56. In this way a multilayer foil 57 is formed, which foil is built up of the layer of aluminium foil 52 and the layer of polypropylene foil 53.

The multilayer foil 57 is carried through to the rotary die-cutting rollers 58, 59, which cut successive hole patterns 60 in the multilayer foil 57. Once the hole patterns 60 have been formed in the multilayer foil 57, the multilayer foil 57 has become the multilayer foil 57'. The holes 61 of the hole patterns 60 in the multilayer foil 57' extend over the entire width of the multilayer foil 57', i.e. through the layer of aluminium foil 52 as well as through the layer of polypropylene foil 53.

After the hole patterns 60 have been formed by the rotary die-cutting rollers 58, 59, the multilayer foil 57' is carried through to pressure rollers 62, 63, where a layer of polypropylene foil 66 and a layer of polyethylene foil 67, both having a thickness of 30-50 μm, are added to the outer sides of the multilayer foil 57'. By means of coating glues, which have been applied (by means not shown) to one of the facing sides of the layers 66, 67, or to a number of said sides, and to the multilayer foil 57, a multilayer foil 58 comprising the closed foils 66, 67 on the outer sides and, between said foils, the aluminium foil 52 and the polypropylene foil 53 with the holes 61 present therein.

Figure 4:
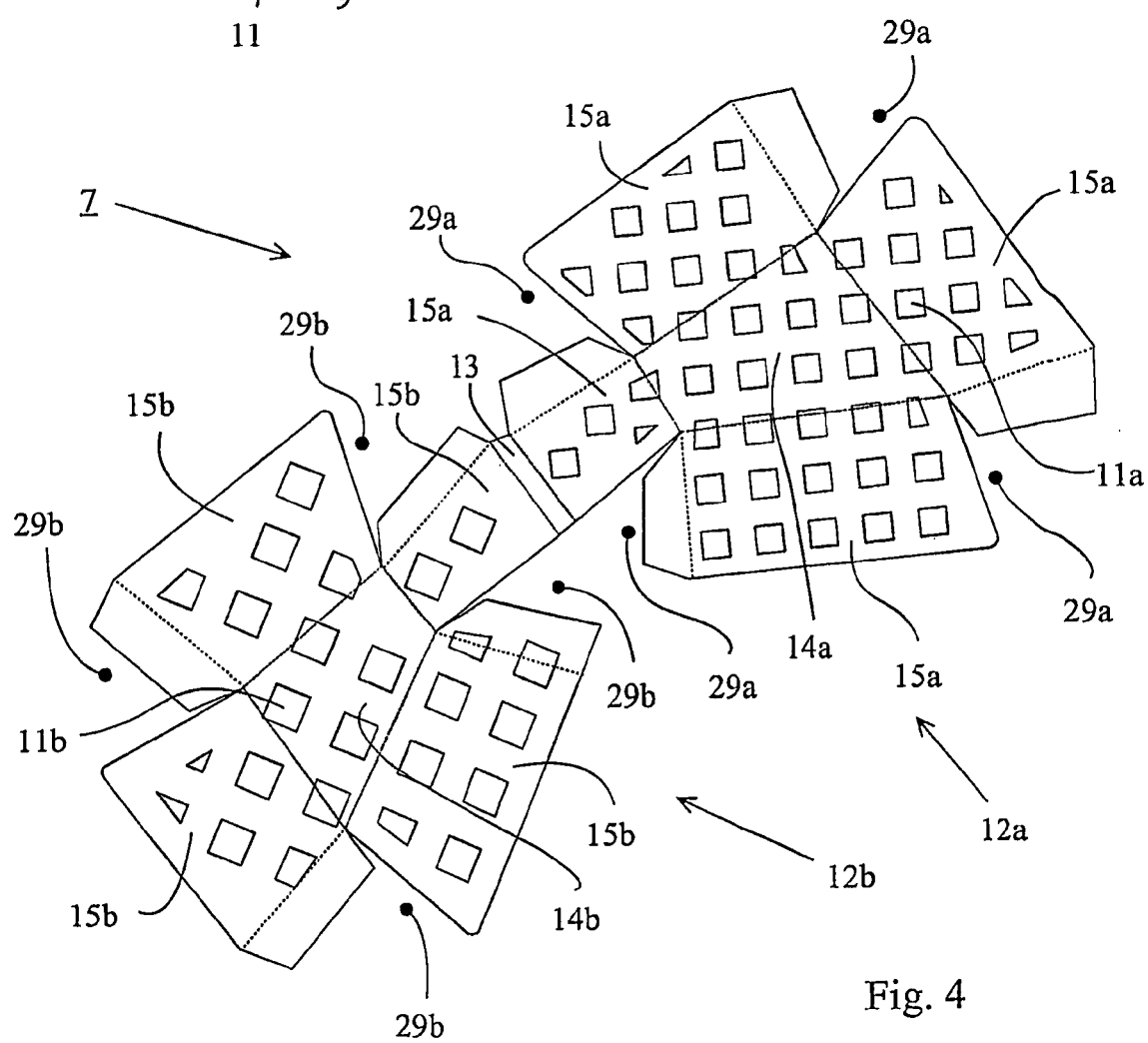
FIG. 4 is a top plan view of a multilayer foil.

As a next stage in the production process, multilayer foil parts 70 comparable to the multilayer foil part 7 in FIG. 4 and suitable for further processing, e.g. as an IML foil for forming part of a partial container as already described above, are cut by means of the rotary die-cutting roller 68 and the counter roller 69. Alternatively it is also possible to wind the multilayer foil 58 onto a roll between stages, in which case the risk of coating glue landing on the outer side of the multilayer foil 58 via the holes 61 is excluded because of the closed nature of the foils 66, 67. In that case the die-cutting operation by means of the rotary die-cutting roller 68 will only be carried out after the roll in question has been unwound again. In the hypothetic case that the foil 58 is eventually used as an IML foil, with the partial container to be produced consisting of polypropylene, the presence of the layer of polyethylene foils 67 constitutes a drawback, and for that reason the foil 67 would be removed from the remaining portion of the multilayer foil 58 prior to the cutting of the multilayer foil parts 70 from the multilayer foil 58". After removal of the polyethylene layers 67, to which end a glue of a suitable type must be used between the polyethylene layer 67 and the polypropylene layer 53, of course, for example the type that is used with stickers, a foil is obtained as indicated at 58" in FIG. 10. The layer of polypropylene foil 53 effects a good bond between the remaining portion of the partial container to be produced and the foil 58" during the IML injection-moulding process.

On the other hand, if the foil 58 is eventually used as, for example, a thermoforming foil, the presence of the polyethylene foil 67 constitutes an advantage, and the foil would not be removed prior to the cutting of the multilayer foil parts 70 from the multilayer foil 58. This situation is shown in FIG. 10.

To enable manipulation of the multilayer foil parts 70 by means of a pick-and-place robot and holding the multilayer foil parts 70 in position in a mould, it is very advantageous if said the foil parts can be electrostatically charged, for example by incorporating electrostatically chargeable polypropylene in the multilayer foil parts 70.

In the above production method as described with reference to FIG. 10, frequent use has been made of a coating glue for bonding together various layers of the multilayer foils that are used. Such glue types frequently have a long drying time, which could be advantageously shortened, for example by using hot air or UV radiation. In addition to that it is emphasised that it is possible within the framework of the invention to carry out the various operations of the production method at different locations, i.e. not in the same production line, although it is preferable to carry out the entire production method in one production line.

In FIG. 10, numeral 58' indicates an alternative structure for the multilayer foil 58, from which on the one hand the polypropylene layer 53 has been left out, whilst on the other hand the layer 67 is made of polypropylene, just like the layer 66, rather than of polyethylene. Within this context it is noted that an important function of the polypropylene foil 53 for the foil 58 is to strengthen the aluminium foil 52 in connection with the forming of the holes 61 therein by means of the rotary die-cutting rollers 58, 59. Within the framework of the present invention, the holes can also be provided in a different manner, of course, for example by laser cutting. If the processing of the layer of aluminium foil 52 does not require that the layer is strengthened, for example if it is elected to use a thicker layer of aluminium foil 52, it might be decided not to use a strengthening layer such as the layer of polypropylene foil 53. In such a case this would lead to the formation of a multilayer foil 58', in which the layer of polypropylene foil 67 would form part of the partial container to be produced, effecting a good bond between the multilayer foil 58' and the remaining (polypropylene) part of the partial container during the IML injection-moulding process.

In the above, the invention has been explained by means of a preferred embodiment of the present invention. It will be apparent to those skilled in the art that countless variants to the invention are possible within the scope of this invention. Thus it is pointed out, for example, that it is also possible within the framework of the invention to produce containers that comprise only one compartment. Preferably, such containers are formed with connecting means in that case, such as a snap connections, for coupling the containers together, thus making it possible for the consumer to compose a complete meal according to his or her own requirements. Alternatively, such containers might be jointly packaged without connecting means being provided. Also from the viewpoint of the production process used for filling the containers, such an embodiment provides this major advantage that the various food components to be filled into the separate containers no longer need to be physically brought together at the same location. In addition to that, the storage life of a complete meal is no longer determined by the food component having the shortest storage life in that case. With regard to the production of such containers, it is a major advantage that producers can confine themselves to a relatively small number of shapes and/or sizes, which may each be provided with one of a limited number of different microwave radiation-influencing layers.

In addition to that it is possible within the framework of the invention to provide a multilayer foil not on the (eventual)

outer side of a partial container but on the (eventual) inner side that faces towards the food inside the container of which the partial container in question forms part.

Finally another application of a multilayer foil, such as the multilayer foil 58, comprising a microwave radiation-influencing material layer, such as the aluminium layer 52, can be mentioned, viz. as a cover of one compartment or a number of compartments, such as the compartments 2a, 2b and/or 2c of the dish 1 of FIG. 1, after said compartments have been filled with foodstuffs. Thus it is possible to provide the upper side of the compartments with a microwave radiation-influencing material layer as well in a relatively simple manner. The upper side of all the compartments can be covered with a single foil in one processing step, after the compartments have been filled of course, but on the other and it is also possible to cover the compartments individually with a multilayer foil after they have been filled. An important advantage is the fact that in principle it is not necessary in that case to use a separate cover having a microwave radiation-influencing material layer incorporated therein. To cover a compartment with the multilayer foil, said foil can be bonded to the upper sides of the upper circumferential edges of the compartment in question, using a standard sealing technique. Alternatively, a glued joint might be used. According to yet another alternative, a foil that does not influence microwave radiation might be used first for closing the upper side of a compartment, for example by means of a sealing technique. Subsequently, the multilayer foil comprising the microwave radiation-influencing layer might be affixed to said foil, for example by means of a coating glue.

The invention claimed is:

1. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
   providing a flat, wrinkle-free multilayer foil comprising
      said microwave radiation-influencing material layer, said microwave radiation-influencing material layer being wrinkle free, and
      at least one material layer that does not influence microwave radiation, which is bonded thereto on at least one side of the microwave radiation-influencing material layer,
   bonding one side of the multilayer foil to a remaining portion of the container part in question by in mould labeling of said multilayer foil with said microwave radiation-influencing material layer wrinkle free, in such a manner that the material layer of the multilayer foil that does not influence microwave radiation is present on a free surface of the container part, by positioning the multilayer foil inside a mould during the forming of a container part in said mould for the purpose of bonding the microwave-influencing material layer to the remaining portion of the container part during said forming of the container part, said microwave radiation-influencing material layer being wrinkle free when being positioned in said mould.

2. A method according to claim 1, comprising the step of bonding the multilayer foil to the remaining portion of the container part in such a manner that the material layer of the multilayer foil that does not influence microwave radiation is present on the outer side of the container part.

3. A method according to claim 1, comprising the step of forming the container parts by injection-moulding the container parts in an injection mould.

4. A method according to claim 1, wherein the material layer that does not influence microwave radiation is a closed layer.

5. A method according to claim 1, wherein at least one hole in the microwave radiation-influencing material layer is formed in the same production line as the one in which the multilayer foil is bonded to the remaining portion of the container part in question.

6. A method according to claim 1, wherein the multilayer foil comprises cut-out corner portions.

7. A method according to claim 1, wherein the multilayer foil is provided in a condition in which a material layer that does not influence microwave radiation is present on either side of the microwave radiation-influencing material layer.

8. A method according to claim 1, wherein the material layer(s) that do(es) not influence microwave radiation is/are made of the same material as the remaining portion of the container part.

9. A method according to claim 1, wherein the upper side of a compartment of a container, after being filled with a foodstuff, is covered with a further multilayer foil comprising a further microwave radiation-influencing material layer and at least one material layer that does not influence microwave radiation, which is bonded thereto on one side of said further microwave radiation-influencing material layer, in such a manner that said further microwave radiation-influencing material layer of said further multilayer foil is present on the side remote from the interior of the filled compartment of said further material layer that does not influence microwave radiation.

10. A method according to claim 9, wherein said further multilayer foil is directly bonded to an upper circumferential edge of the filled compartment.

11. A method according to claim 9, wherein said further multilayer foil is glued onto a separate sealing foil, which is directly bonded to an upper circumferential edge of the filled compartment.

12. A method according to claim 1, characterized in that the multilayer foil is electrostatically chargeable.

13. The method of claim 1, wherein the step of providing a multilayer foil comprises providing a multilayer foil in which said microwave radiation-influencing material layer is directly bonded to said at least one layer that does not influence microwave radiation without an additional layer therebetween.

14. The method of claim 1, wherein said multilayer foil substantially conforms to the shape of the mould prior to positioning said foil inside the mould.

15. The method of claim 1, wherein said microwave radiation-influencing material layer is provided with at least one hole.

16. A method according to claim 15, wherein said at least one hole includes a plurality of holes.

17. A method according to claim 16, wherein said plurality of holes are provided in different patterns for different compartments.

18. A method according to claim 16, wherein said plurality of holes are provided in different sizes for different compartments.

19. The method of claim 1, wherein the microwave radiation-influencing material layer comprises aluminium.

20. The method of claim 19, wherein the at least one material layer that does not influence microwave radiation comprises polypropylene.

21. The method of claim 1, wherein the at least one material layer that does not influence microwave radiation comprises polypropylene.

22. A container part according to claim 1, wherein the at least one material layer that does not influence microwave radiation comprises paper.

23. The method of claim 1, wherein the microwave radiation-influencing material layer has a maximum thickness of 50 μm.

24. The method of claim 1, wherein the microwave radiation-influencing material layer has a maximum thickness of 30 μm.

25. The method of claim 1, wherein the multilayer foil has a maximum thickness of 200 μm.

26. The method of claim 1, wherein the multilayer foil has a maximum thickness of 100 μm.

27. The method according to claim 1, wherein said multilayer foil includes folds whereby the multilayer foil takes the main shape of the mould when placed therein.

28. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
    providing a multilayer foil comprising
        said microwave radiation-influencing material layer provided with at least one hole, and
        at least one material layer that does not influence microwave radiation, which is bonded thereto on at least one side of the microwave radiation-influencing material layer, and
    bonding one side of the multilayer foil to a remaining portion of the container part in question, in such a manner that the material layer of the multilayer foil that does not influence microwave radiation is present on a free surface of the container part, by positioning the multilayer foil inside a mould during the forming of a container part in said mould for the purpose of bonding the microwave-influencing material layer to the remaining portion of the container part during said forming of the container part;
    wherein
        the multilayer foil is provided in a condition in which a material layer that does not influence microwave radiation is present on either side of the microwave radiation-influencing material layer, and
        one of the two material layers that do not influence microwave radiation is detached from the multilayer foil before the multilayer foil is bonded to the remaining portion of the container part.

29. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
    providing a multilayer foil comprising said microwave radiation-influencing material layer and at least one material layer that does not influence microwave radiation, which is bonded thereto on at least one side of the microwave radiation-influencing material layer, wherein the multilayer foil is provided in a condition in which a material layer that does not influence microwave radiation is present on either side of the microwave radiation-influencing material layer,
    bonding one side of the multilayer foil to a remaining portion of the container part in question, in such a manner that the material layer of the multilayer foil that does not influence microwave radiation is present on a free surface of the container part, by positioning the multilayer foil inside a mould during the forming of a container part in said mould for the purpose of bonding the microwave-influencing material layer to the remaining portion of the container part during said forming of the container part,
    wherein one of the two material layers that do not influence microwave radiation is detached from the multilayer foil before the multilayer foil is bonded to the remaining portion of the container part.

30. The method of claim 29, wherein said multilayer foil substantially conforms to the shape of the mould prior to positioning said foil inside the mould.

31. The method of claim 29, wherein the step of providing a multilayer foil comprises providing a multilayer foil in which said microwave radiation-influencing material layer is directly bonded to said at least one layer that does not influence microwave radiation without an additional layer therebetween.

32. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
    providing a flat, wrinkle-free multilayer foil comprising
        said microwave radiation-influencing material layer, said microwave radiation-influencing material layer being wrinkle free, and
        at least one material layer that does not influence microwave radiation, which is bonded thereto on at least one side of the microwave radiation-influencing material layer,
        wherein the multilayer foil is electrostatically chargeable,
    bonding one side of the multilayer foil to a remaining portion of the container part in question by in mould labeling, in such a manner that the material layer of the multilayer foil that does not influence microwave radiation is present on a free surface of the container part, by positioning the multilayer foil inside a mould during the forming of a container part in said mould for the purpose of bonding the microwave-influencing material layer to the remaining portion of the container part during said forming of the container part, said microwave radiation-influencing material layer being wrinkle free when being positioned in said mould.

33. The method of claim 32, wherein said multilayer foil substantially conforms to the shape of the mould prior to positioning said foil inside the mould.

34. The method of claim 32, wherein the step of providing a multilayer foil comprises providing a multilayer foil in which said microwave radiation-influencing material layer is directly bonded to said at least one layer that does not influence microwave radiation without an additional layer therebetween.

35. The method according to claim 32, wherein said multilayer foil includes folds whereby the multilayer foil takes the main shape of the mould when placed therein.

36. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
providing a multilayer foil comprising
said microwave radiation-influencing material layer, and
at east one material layer that does not influence microwave radiation, which is bonded thereto on at least one side of the microwave radiation-influencing material layer,
wherein the multilayer foil is electrostatically chargeable; and
bonding one side of the multilayer foil to a remaining portion of the container part in question, in such a manner that the material layer of the multilayer foil that does not influence microwave radiation is present on a free surface of the container part, by positioning the multilayer foil inside a mould during the forming of a container part in said mould for the purpose of bonding the microwave-influencing material layer to the remaining portion of the container part during said forming of the container part;
wherein the step of providing a multilayer foil includes providing at least one hole extending through one of said material layers, said one material layer being an outer layer of the multilayer foil.

37. A method for producing self-supporting container parts, such as dishes or covers, for containers for foodstuffs to be treated in a microwave oven, said containers each comprising at least one compartment for receiving the foodstuffs, along at least part of the circumferential surface of which compartment a microwave-radiation influencing material layer is provided in the wall of at least one associated container part, comprising the steps of
providing a multilayer foil comprising
said microwave radiation-influencing material layer provided with at least one hole, and
at least one material layer that does not influence microwave radiation, which is bonded thereto on at least one side of the microwave radiation-influencing material layer, and
bonding one side of the multilayer foil to a remaining portion of the container part in question, in such a manner that the material layer of the multilayer foil that does not influence microwave radiation is present on a free surface of the container part, by positioning the multilayer fail inside a mould during the forming of a container part in said mould for the purpose of bonding the microwave-influencing material layer to the remaining portion of the container part during said forming of the container part;
wherein the step of providing a multilayer foil includes providing at least one hole extending through one of said material layers, said one material layer being an outer layer of the multilayer foil.

38. The method of claim 37, wherein the step of providing a multilayer foil comprises providing a multilayer foil in which said microwave radiation-influencing material layer is directly bonded to said at least one layer that does not influence microwave radiation without an additional layer therebetween.

39. The method of claim 37, wherein the other of said material layers is provided with no holes.

40. A method according to claim 37, comprising the step of forming the container parts by thermoforming the container parts in a thermoforming mould.

41. A method of providing heated foodstuffs, comprising the steps of:
producing containers with self-supporting container parts produced according to the method of claim 1;
placing foodstuffs in said produced containers; and
heating said containers and foodstuffs in a microwave oven.

* * * * *

UNITED STATES PATENT AND TRADEMARK OFFICE
CERTIFICATE OF CORRECTION

Page 1 of 1

PATENT NO. : 8,696,854 B2
APPLICATION NO. : 10/585484
DATED : April 15, 2014
INVENTOR(S) : Franciscus Johannes Maria Van De Weijer et al.

It is certified that error appears in the above-identified patent and that said Letters Patent is hereby corrected as shown below:

On the Title Page, Item (54) and in the Specification, Column 1, Title should read:

NOx ELIMINATION INJECTOR FIRING CONTROL CIRCUIT

On the Title Page:

The first or sole Notice should read --

Subject to any disclaimer, the term of this patent is extended or adjusted under 35 U.S.C. 154(b) by 1159 days.

In the Claims:

Claim 37, (column 20, line 13), delete "fail" and substitute therefor "foil".

Signed and Sealed this
Third Day of November, 2015

Michelle K. Lee
*Director of the United States Patent and Trademark Office*